United States Patent [19]

Giffin, III et al.

[11] 4,254,619
[45] Mar. 10, 1981

[54] PARTIAL SPAN INLET GUIDE VANE FOR CROSS-CONNECTED ENGINES

[75] Inventors: Rollin G. Giffin, III, Montgomery; Onofre T. M. Castells, Fairfield, both of Ohio

[73] Assignee: General Electric Company, Cincinnati, Ohio

[21] Appl. No.: 901,934

[22] Filed: May 1, 1978

[51] Int. Cl.³ .......................... F02K 3/04; F02K 3/075
[52] U.S. Cl. ................................ 60/226 R; 60/226 B; 244/55
[58] Field of Search ................ 60/39.15, 204, 224, 60/226 R, 226 A, 226 B; 244/55, 60; 415/160, 161

[56] References Cited

U.S. PATENT DOCUMENTS

| | | | |
|---|---|---|---|
| 2,503,006 | 4/1950 | Stalker | 60/226 R |
| 3,449,914 | 6/1969 | Brown | 60/225 |
| 3,472,321 | 10/1969 | Ellinger | 60/226 R |
| 3,729,957 | 5/1973 | Petrie et al. | 60/226 R |
| 4,112,677 | 9/1978 | Kasmarik | 60/226 R |
| 4,116,405 | 9/1978 | Bacchi et al. | 244/55 |

Primary Examiner—Louis J. Casaregola
Attorney, Agent, or Firm—Dana F. Bigelow; Donald W. Walk; Derek P. Lawrence

[57] ABSTRACT

A pair of turbofan engines are cross connected such that during normal-mode operation horsepower can be shared by the respective cores, and when one engine core becomes inoperative the fan of that engine can be driven by the turbine of the operative engine to thereby maintain a substantial thrust output. In order to balance the respective thrust outputs, variable inlet guide vanes are controlled to decrease the fan mass flow in the operative engine and increase the fan mass flow in the inoperative engine. The variable inlet guide vanes are so constructed as to only partially span the fan duct so as to not appreciably affect the airflow to the core when the inlet guide vane angle setting is altered to allow the core to thereby retain a high level of supercharging during this operational period of maximum power demand.

1 Claim, 7 Drawing Figures

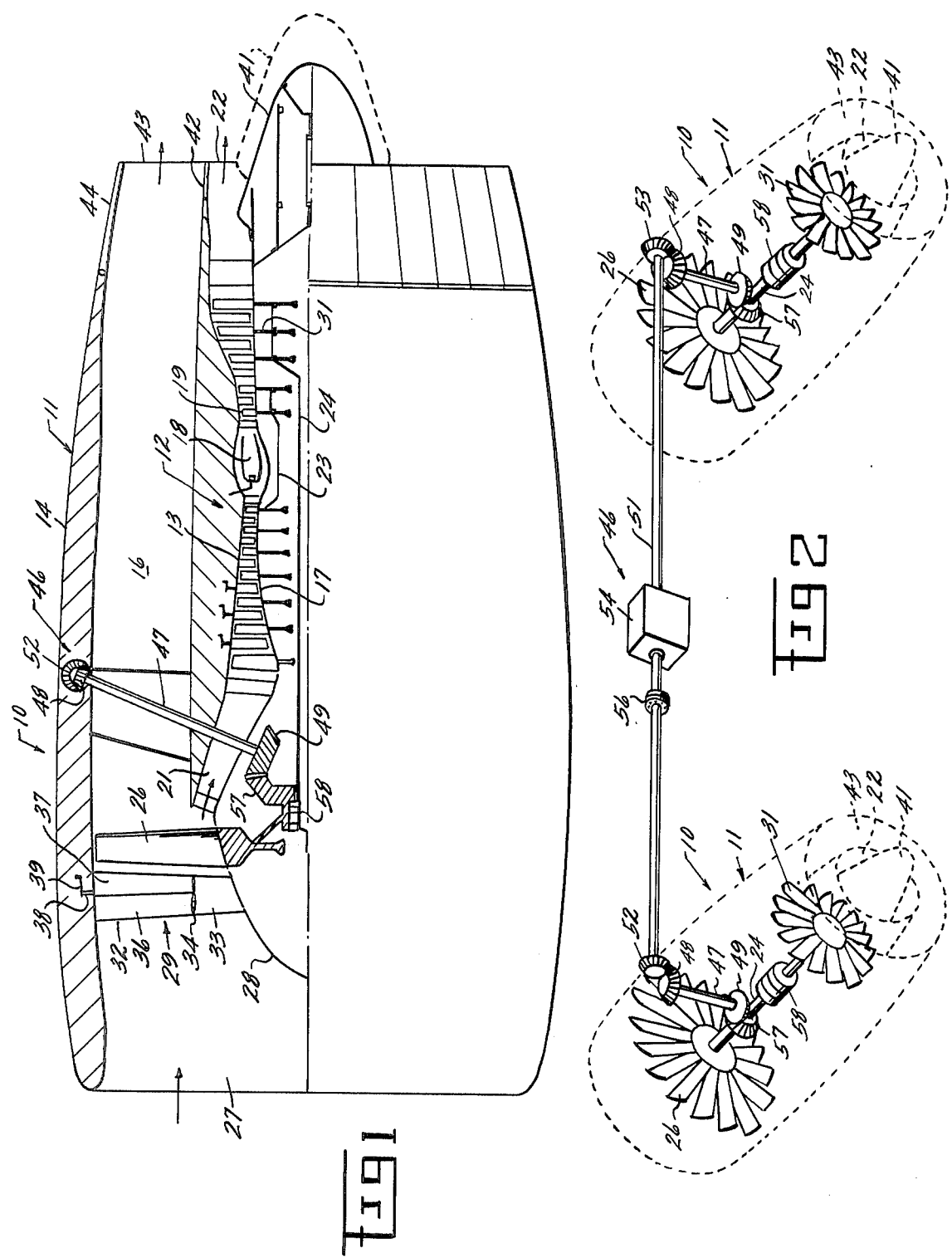

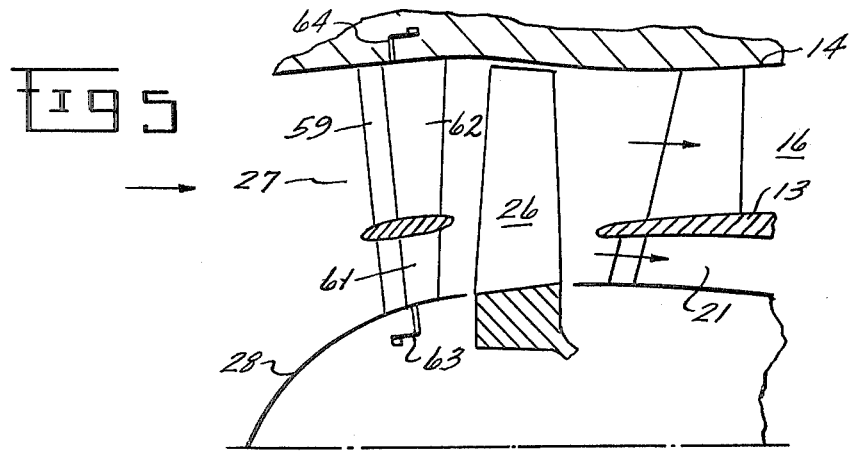
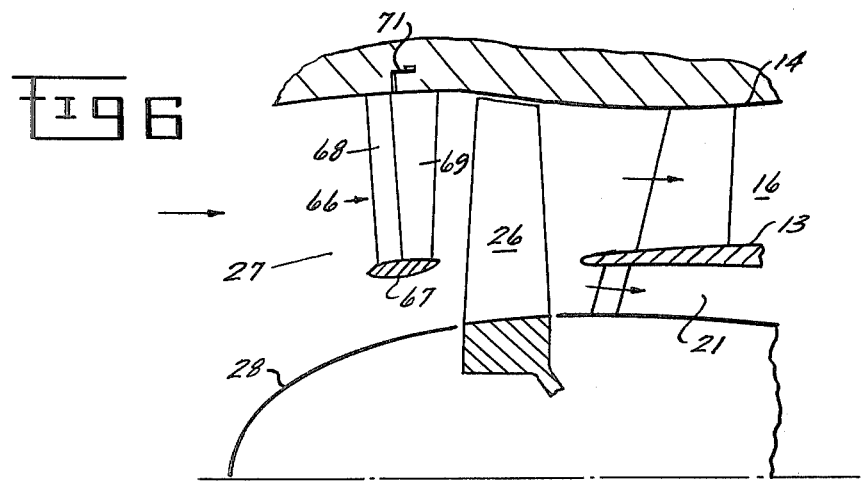
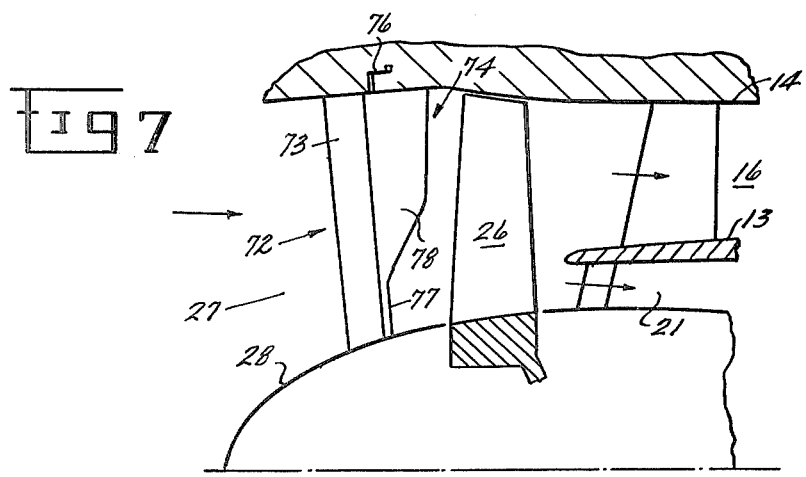

PARTIAL SPAN INLET GUIDE VANE FOR CROSS-CONNECTED ENGINES

BACKGROUND OF THE INVENTION

This invention relates generally to gas turbine engines and, more particularly, to a method and apparatus for the control of thrust in turbofan engines.

Turbofan engines are required to operate efficiently over a wide range of flight conditions and speeds. These conditions include maximum power takeoff and climb, part-power cruise, and low-altitude, low-power loiter. In order to meet these requirements of variable thrust while maintaining an acceptable level of specific fuel consumption, it is common to selectively vary certain flow areas and characteristics within the fan and core portion of the engine. One of the flows which may be varied is that in the fan duct, and this many be accomplished by use of variable inlet guide vanes (IGV's) which are selectively varied over a range to modulate the total airflow in the duct.

In a vertical takeoff and landing (VTOL) type aircraft, there are further requirements for the propulsion system. In addition to providing a total lift greater than the maximum gross takeoff weight, the system must also provide the moment necessary for pitch, yaw and roll control of the aircraft. In the vertical mode of operation, this control moment must be supplied entirely by the propulsion system since the aircraft is essentially at zero flight speed and the conventional control surfaces are unable to assist in this control. For example, in a two-engine aircraft, in order to provide the necessary moment for aircraft attitude control during vertical takeoff and landing, the engines must be capable of operating at a high response rate to modulate the thrust in the range of +/−20%. Further, in order that the aircraft retain its altitude while executing the various control requirements, it is necessary that the total lift force remain substantially constant.

Because of the total dependency on the propulsion system alone, the critical periods of VTOL aircraft operation are during vertical takeoff and landing. Of the two, the landing is much more critical because of the exposure time to failures includes the complete duration of the mission. VTOL propulsion system design considerations must therefore include the possibility of one engine core being lost, a condition commonly referred to as "one-core-inoperative" (OCI). This is particularly true in a two-engine aircraft. During such an emergency landing condition, it is necessary to provide a total lift force substantially equal to the aircraft gross landing weight, and also to provide adequate aircraft attitude control. One approach to this situation is to provide a propulsion interconnect system wherein power is transferred from an operable engine core or gas producer to a separate lift augmenter device. Typical lift augmenters include remote gas coupled turbotip fans, gas interconnected ejectors or shaft interconnected fans. Inasmuch as lift augmenters are generally reliable and relatively free of failure, it is only the failures of the gas generators that are normally considered in the one-core-inoperative situation.

Where the lift augmenter comprises a front fan in a turbofan engine, and the respective fans are interconnected by a shaft to accommodate horsepower sharing during normal operation, and especially during a one-engine-out situation, there are additional complications to consider. In such a propulsion system, since the fans are interconnected by a common shaft, they are constrained to operate at identical speeds. However, the total thrust being delivered by the inoperative engine with its core portion shut down is significantly less than the thrust being delivered by the operative engine. Thus, it is necessary to balance out the respective thrust by closing down the inlet guide vanes of the operative engine while opening up those of the inoperative engine. This presents a problem in the operative engine since the core is now required to drive both fans and therefore needs to operate at increased flow and pressure, but a decreasing of the fan flow by closing down of the inlet guide vanes in a conventional full-span IGV tends to reduce the supercharging to the core engine to thereby reduce the core flow because the supercharging pressure is lost. The problem is further complicated by the requirement for thrust modulation to effect aircraft attitude control. This is normally accomplished by opening of the inlet guide vanes one engine to the maximum control position and partially closing the inlet guide vanes on the other engine to the minimum control position. In order to provide this capability, the inlet guide vanes are usually in the partially closed position. That is, the total capacity of the fan system is used only during the maximum control period and at all other conditions the inlet guide vane is partially closed. Thus, during these conditions, and especially when the operative engine is in the minimum control position, the flow of air to the core is reduced because supercharging capability is lost. For example, a fan operating at 100% corrected speed and designed to produce a pressure ratio of 1.50 at a maximum control or zero inlet guide vane setting produces a pressure ratio of 1.39 when the inlet guide vane is closed 15°, the setting required to achieve 20% thrust modulation from maximum control to nominal. When this reduction in pressure ratio is coupled with that required to balance the loss of thrust of the inoperative core, the reduction in flow and pressure ratio becomes substantial. As these reductions are applied to the core of the operative engine, considerable supercharging capacity is lost and, as a result, the required size of the core must necessarily be larger in order to accommodate these periods of operation. The core is thus sized by the requirements presented when one core is out during vertical landing, the IGV's of the operative engine are in a minimum control position and the IGV's of the inoperative engine are in a maximum control position.

It is therefore an object of the present invention to provide an improved cross-connected turbofan engine arrangement.

Another object of the present invention is the provision in a VTOL propulsion system for minimizing the size of the core.

Yet another object of the present invention is the provision in a turbofan engine for significantly reducing the bypass flow without reducing the supercharging pressure ratio to the core.

Yet another object of this invention is the provision in a turbofan engine for using substantially the total capacity of the fan hub supercharging during all modes of engine operation.

Another object of the present invention is the provision in a VTOL propulsion system for a thrust varying means which is economical to manufacture and effective in use.

These objects and other features and advantages become more readily apparent upon reference to the following description when taken in conjunction with the appended drawings.

SUMMARY OF THE INVENTION

Briefly, in accordance with one aspect of the invention, a pair of front fan turbofan engines are provided with cross-connect means such that when one of the engines becomes inoperative, the core of the other engine will act to drive the fan of the inoperative engine. Variable inlet guide vanes are provided so that the bypass flow in the operative engine can be reduced to less than that of the inoperative engine. In this way, the thrust produced by the core of the operative engine is offset and balanced by the inoperative engine's having a greater bypass flow than the operative engine. In order to prevent the reduction of supercharging capability to the core of the operative engine when the inlet guide vanes are closed down, the inlet guide vanes are so constructed as to allow a reduction in the bypass flow while not causing an associated reduction in flow to the core. In this way, the core supercharging capability is maintained during the critical operational time when the maximum core power is required to thereby minimize the size of the core which is required.

By another aspect of the invention, each of the engines has variable inlet guide vanes for selectively varying the bypass flow and thus modulating the thrust of the engine. By properly coordinating the controls of the two inlet guide vane systems, the thrust differences in the two engines can be used for roll, pitch or yaw control.

By another aspect of the invention, the variable inlet guide vanes may be so constructed as to be cantilevered from the nacelle to extend radially inward only insofar as it will effect the bypass flow and not the flow to the core. The flow and pressure ratio near the fan hub will then remain essentially unchanged with variation of the inlet guide vane angles.

Other variations in the design of the inlet guide vanes may include one wherein the inlet guide vane has radially inner and outer portions which are independently variable and wherein the inner portion may be set at the fully open position while allowing the outer portion to be partially closed to reduce the bypass flow.

Another inlet guide vane design comprises one wherein the stem portion of the inlet guide vane extends radially inward to the fan hub, but the airfoil portion thereof tapers down to the stem at the point where it enters the flow stream to the core. Rotation of the inlet guide vane then allows variation of the flow in the outer portion of the duct while causing little or no change at the inner portion thereof.

In the drawings as hereinafter described, a preferred embodiment and modified embodiments are depicted; however, various other modifications and alternate constructions can be made thereto without departing from the true spirit and scope of the invention.

BRIEF DESCRIPTION OF THE DRAWINGS

FIG. 1 is a longitudinal cross-sectional view of a turbofan engine having inlet guide vanes in accordance with the preferred embodiment of the invention.

FIG. 2 is a perspective view of a pair of cross-connected turbofan engines in accordance with the preferred embodiment of the invention.

FIGS. 5-7 show modified embodiments of the variable inlet guide vane portion of the present invention.

DESCRIPTION OF THE PREFERRED EMBODIMENT

Figure 3:
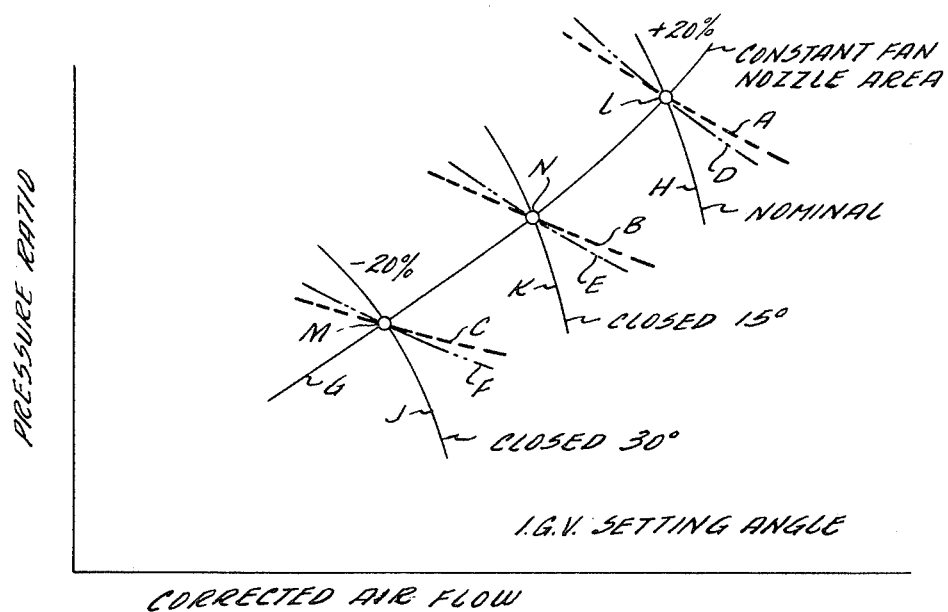
FIG. 3 is a constant-corrected speed fan map showing performance variation over a range of inlet guide vane angle settings in accordance with the preferred embodiment of the invention.

Referring now to FIG. 1, the invention is shown generally at 10 as being incorporated into a turbofan engine 11 which comprises a core engine 12 having a supporting structure or casing 13 disposed in an annular fan casing 14 so as to cooperatively define a bypass duct 16 therebetween. The core engine 12 includes a high pressure compressor 17, a combustor 18 and a high pressure turbine 19 disposed in serial flow relationship between a core inlet 21 and core exhaust 22. The compressor 17 and the turbine 19 are interconnected by a core engine shaft 23.

The casing 13 supports the low pressure shaft 24 for rotation independently of the core engine shaft 23 in a manner well known in the art. Drivingly attached to the front end of the low pressure shaft 24 is a fan 26 extending generally radially across an annular inlet duct 27 which is defined on the outer side by the fan casing 14 and on the inner side thereof by a bullet nose 28. A plurality of inlet guide vanes 29 are disposed forward of the fan 26 for selective modulation of the airflow in the inlet duct 27 and in the bypass duct 16. The fan 26, which acts to compress the air prior to its flow into the bypass duct 16 and the compressor inlet duct 21, is driven by the low pressure shaft 24 which receives its power from the low pressure turbine 31 in a manner well known in the art.

The inlet guide vanes 29 comprise radially outer and inner portions 32 and 33, respectively, having an annular ring 34 therebetween. The inner portion 33 is fixed and acts to direct the airflow to the fan in the vicinity of the hub in such a manner as to provide relatively unrestricted flow of the air in the vicinity of the hub. The inlet guide vane outer portion 32 is split into forward and rear portions 36 and 37, respectively, with the forward portion 36 being fixed and the rear portion 37 being rotatable about its stem 38 by way of a variable control mechanism 39. In operation, the split variable inlet guide vane 29 acts to modulate the flow in the bypass duct 16 without appreciably modulating the flow to the compressor inlet 21, as will be more fully described hereinafter.

The above-described turbofan engine is intended to be one of a plurality of front fan engines in a VTOL propulsion system wherein the thrust may be selectively directed by known means such as for example rotating the turbofan nacelles or the use of vectoring nozzles to accommodate the horizontal flight and vertical takeoff and landing modes of operation. The exhaust nozzle of the FIG. 1 embodiment is of the conventional type and comprises at the core exhaust 22 a translatable plug 41 which operates to modulate the area of the core exhaust 22. The bypass duct 16 terminates in a fan exhaust duct 43 which is defined on the inner side by the core cowl 42 and on the outer side by the variable exhaust flaps 44. The area of the exhaust nozzle 43 is then selectively varied by operation of the variable exhaust flaps 44.

Direction of the thrust is selectively varied between the hozizontal and vertical directions by rotation of the engine in a manner well known in the art.

Referring now to FIG. 2, a typical two-engine propulsion system is shown to include a pair of turbofan engines of the type shown in FIG. 1, with one on either side of the aircraft fuselage. In order to share power during control modes, and more importantly to provide for the situation wherein the core of one of the engines is lost by way of foreign object damage or the like, a cross-connect system 46 is provided so that the core of the operative engine can be used to drive the fan of the inoperative engine. This cross-connect system 46 may be any of a number of various hydraulic or mechanical types, the one shown being of a simple mechanical type. Each of the engines includes a power transfer shaft 47 extending radially outward from the low pressure shaft 24 and having outer and inner bevel gears 48 and 49 on its opposite ends. Extending between the two engines is an interconnecting shaft 51 having bevel gears 52 and 53 disposed on its opposite ends for driving engagement with the respective outer bevel gears 48. A gearbox 54 is provided intermediate the two ends of the interconnecting shaft 51 for the purpose of driving various accessories or a remote fan. Also provided in the interconnecting shaft 51 is a coupling 56 for disconnecting the system in the case of an emergency.

At the inner end of the power transfer shafts 47 of each of the engines is a drive bevel gear 57 which is rigidly connected and driven by the low pressure shaft 24 and which meshes with the inner bevel gear 49 in driving relationship. Also located on the low pressure shaft 24, between the drive bevel gear 57 and the low pressure turbine 31 is a one-way clutch 58 which provides for the transmission of power from the low pressure turbine 31 to the low pressure shaft 24 but prevents the transfer of power in the opposite direction.

In operation, when both engines are operative, the cross-connect system 46 connects the two engines such that during cruise condition operation each engine operates independently with the low pressure turbine 31 driving its respective fan 26 by way of the low pressure shaft 24 to produce a high-volume flow of air to the bypass duct 16 and the fan exhaust duct 43. During the control mode of operation there will be a sharing of horsepower by way of the cross-connect system 46. In the event that one of the engine cores becomes inoperative, that core is shut down by way of shutting off the fuel flow to its combustor. The low pressure turbine 31 of that inoperative engine then receives no hot gases and becomes essentially inoperative in driving its fan 26. The cross-connect system 46 then transmits power from the operable engine by way of its power transfer shaft 47, the interconnect shaft 51 and the power shaft 47 of the inoperative engine. The one-way clutch allows the low pressure shaft 24 of the inoperable engine to be driven without interference of its inoperable low pressure turbine 31.

Consider now for a two-engine system, wherein the fans are constrained to operate at identical speeds through the interconnecting shaft, the manner in which the inlet guide vanes 29 may be used to vary the flow and pressure ratio of the fans to modulate the thrust in the respective fans and thereby provide roll, pitch or yaw control. Assume that the core thrust is small in comparison to the fan thrust and neglect the impact of differential supercharging on the core. Further, assume a requirement of +/−20% thrust modulation while maintaining a constant total thrust. Shown in FIG. 3 is a constant-speed fan map with indicated performances at various inlet guide vane angle settings. Lines A, B and C represent values of constant thrust, and crossing lines D, E and F represent constant horsepower. It is desirable to operate at both constant thrust and constant horsepower conditions. Further, in order to simplify the control system, it is easier for thrust modulating purposes to hold the nozzle area constant, and this parameter is indicated by the line G in the fan map. In the nonthrust-modulating mode of operation, the two engines provide the same amount of flow and pressure ratio as represented by the point N on the fan map. When full thrust modulation is called for, it will require one of the fans to migrate to the nominal +20% thrust line H and the other to migrate to the nominal −20% thrust line J. Since the two fans are constrained to the same speed, and the map is a constant speed map, and further since it is desired to maintain a constant fan nozzle operating line, the only control action required is that to change the setting angles of the fan inlet guide vanes. Accordingly, the inlet guide vanes of one of the fans is opened to the nominal position such that the fan operates at point L, and the inlet guide vane of the other fan is closed down substantially the same amount such that the fan operates at point M. In this way, the thrust of the two engines is effectively modulated to obtain the necessary pitch, roll or yaw control while a substantially constant total thrust is maintained. It will be noted that the fan horsepower increase from N to L is slightly greater than the fan horsepower decrease from N to M. Thus, in order to prevent a slight decrease in the fan speed or thrust, it may be necessary to increase the core engine horsepower demand slightly so as to thereby increase the core speed.

Figure 4:
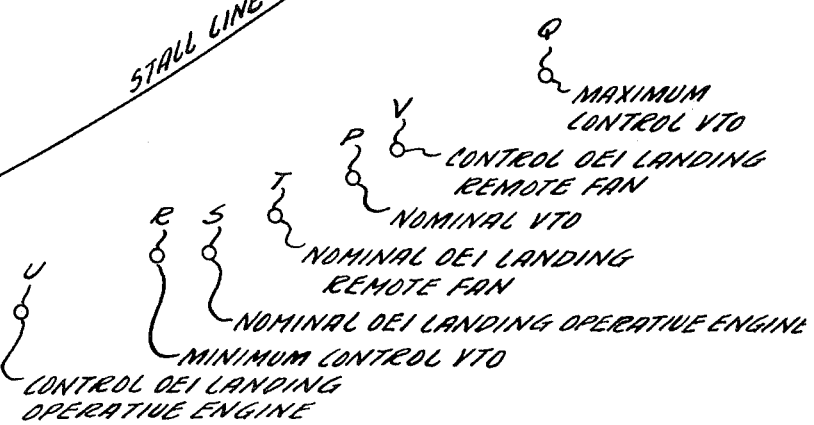
FIG. 4 is a map of the fan portions of a typical two-fan, two-core VTOL engine system in accordance with the preferred embodiment of the invention.

Considering now the operation of the fan portions of a typical two-fan, two-core VTOL engine system, FIG. 4 shows the variations of corrected airflow and pressure ratio in the thrust-modulating mode of operation and in the one-core-inoperative condition. Point P represents the operating condition of both fans at the nominal takeoff condition when both engines are operational. In each of the engines, the inlet guide vanes are at the nominal or 22° closed position and the fan is operated at 108% corrected speed. When a thrust modulation requirement is imposed, the inlet guide vanes on one of the engines is opened to the maximum control position and its fan operates at point Q on the map. The inlet guide vanes of the other engine are closed to the 39° or minimum control position and its fan operates at point R on the map. During this thrust modulation mode both of the fans again operate at 108% corrected speed.

Now assume that one of the engines has become inoperative, and further that the fan of that engine has incurred no damage. The operator will immediately shut down the core of that engine such that the core of the operative engine acts to drive the fan of the inoperative engine. Since the core of the operative engine is producing a certain amount of thrust, it is necessary to have a greater amount of airflow in the fan duct of the inoperative engine than in the operative engine such that the thrust produced by the operative core is offset so that the total thrust of the inoperative engine is substantially equal to the total thrust of the operative engine. The fan performance characteristics for the operative and inoperative engines are then represented by the points S and T, respectively, of FIG. 4.

Now let us assume a further requirement of thrust modulation for purposes of roll control, and in particular let us assume that it is necessary to decrease by 20% the thrust of the operative engine and to increase by 20% the thrust of the inoperative engine. In order to accomplish this thrust modulation while maintaining a substantially constant total thrust, the fans are operated at 100% corrected speed with the inlet guide vanes of the operative engine being closed down to the 45° setting and the inlet guide vanes of the inoperative engine being opened to the 10° setting such that the fan operational points are represented by the points U and V, respectively. For the described configuration, it is this condition under which the largest horsepower demand is made on the core engine. Accordingly, it is this condition which determines the sizing point of the core.

It will be recognized that, with the use of standard inlet guide vanes in the operable engine when its fan is operating at point U, the flow of air would not only be reduced in the outer portions of the fan duct but also near the hub, and thus the degree of supercharging to the core would be decreased. This, in turn, would bring about the requirement for a larger core engine, which is highly undesirable. Thus, the part span inlet guide vane as shown in FIG. 1 is applied to both of the dual engines such that when the inlet guide vanes are operated as described hereinabove, the airflow may be modulated in the bypass duct without any appreciable change to the airflow to the core. In this way the core will be able to meet horsepower demands without having to be overly sized in order to accommodate the modulations of the inlet guide vanes.

Various alternative embodiments of the variable inlet guide vanes are shown in FIGS. 5-7. In FIG. 5, the inlet guide vanes comprise a fixed leading edge portion 59 which extends entirely across the annular inlet duct 27. The trailing edge portion thereof includes inner and outer portions 61 and 62 which are independently variable with the respective variable controls 63 and 64. The variable inlet guide vanes can be operated in such a way that when the outer portion 62 is moved toward the closed position to reduce the flow in the bypass duct 16, the inner portion 61 may remain fixed or be opened even further to maintain a substantially constant, or increased, flow to the compressor inlet duct 21.

Another alternate design of a variable inlet guide vane is shown in FIG. 6 wherein the guide vane 66 is cantilevered from the fan casing 14 and extends radially inward only to the extent of an annular ring 67 which is located in substantial radial alignment with the core casing 13 so as to not disrupt the flow of air to the compressor inlet duct 21. The inlet guide vane 66 is comprised of a fixed forward portion 68 and a rotatable rear portion 69 which is variable by way of a variable pitch control mechanism 71. Again, the inlet guide vane rear portion 69 can be selectively controlled to vary the flow in the bypass duct 16 without changing the flow near the hub or bulletnose 28 of the engine.

A further embodiment of the variable inlet guide vane is shown in FIG. 7 wherein the variable inlet guide vane 72 comprises a forward fixed portion 73 extending between the fan casing 14 and the bulletnose 28. The rear portion 74 is rotatable by way of a variable pitch mechanism 76 and its stem portion 77 extends across the annular inlet duct 27 from the fan casing 14 to the hub 28. The airfoil portion 78 thereof, however, tapers off in the vicinity of the inner boundary of the bypass duct 16 such that when the angle of the rear portion 74 is varied, the flow to the bypass duct 16 is varied but the flow to the compressor inlet duct 21 is not appreciably affected.

While the preferred embodiment and modified embodiments of the present invention have been depicted and described, it will be appreciated by those skilled in the art that many other modifications, substitutions and changes may be made thereto without departing from the true spirit and scope of the invention.

Therefore, having described a preferred embodiment of the invention, what is desired to be secured by Letters Patent of the United States is as follows:

1. A dual turbofan engine arrangement comprising:
   (a) first and second turbofan engines each having a core section and a low pressure system including a fan, a bypass duct and a turbine;
   (b) cross shaft means operably interconnecting said low pressure systems such that said first engine turbine can drive said second engine fan;
   (c) means in said second engine for selectively disengaging its fan from its turbine;
   (d) variable flow means in the bypass duct of said first engine, said flow means being capable of varying the airflow in said bypass duct without appreciably varying the flow to its associated core section; and wherein
   (e) said variable flow means comprises variable inlet guide vanes that are cantilevered at their radially outer ends and do not extend radially inward to an extent that they appreciably affect the airflow to the core.

* * * * *